US00RE35738E

United States Patent [19]

Woo, Jr. et al.

[11] E Patent Number: Re. 35,738

[45] Reissued Date of Patent: Feb. 24, 1998

[54] DATA ENTRY AND ERROR EMBEDDING SYSTEM

[75] Inventors: John Woo, Jr.; Daniel N. Woo, both of Huntsville, Ala.

[73] Assignee: Gamma Research, Inc., Huntsville, Ala.

[21] Appl. No.: 378,174

[22] Filed: Jan. 25, 1995

Related U.S. Patent Documents

Reissue of:

[64] Patent No.: 5,282,267
Issued: Jan. 25, 1994
Appl. No.: 743,207
Filed: Aug. 9, 1991

[51] Int. Cl.[6] ..... G06F 3/14

[52] U.S. Cl. ..... 395/342; 395/346; 395/793; 395/804; 395/769; 382/311

[58] Field of Search ..... 395/157, 146, 395/150, 161, 145, 144, 149, 766–769, 781, 793, 795, 803, 804, 333, 334, 340, 342, 346; 364/419.14, 419.12, 419.2, 419.17; 382/187, 200, 189, 311, 309, 292

[56] References Cited

U.S. PATENT DOCUMENTS

| | | | |
|---|---|---|---|
| 3,631,396 | 12/1971 | Spertus et al. | 353/28 |
| 3,750,112 | 7/1973 | Manly | 395/146 X |
| 3,974,496 | 8/1976 | Aptroot-Soloway | 395/161 |
| 4,112,415 | 9/1978 | Hilbrink | 382/189 |
| 4,646,250 | 2/1987 | Childress | 395/149 |
| 5,119,476 | 6/1992 | Texier | 395/157 |
| 5,231,579 | 7/1993 | Tsuchiya et al. | 395/161 X |
| 5,276,794 | 1/1994 | Lamb, Jr. | 395/149 |

OTHER PUBLICATIONS

Govorovskii, "Automatic Documentation and Mathematical Linguistics", Nauchno–Tekhnicheskaya Informatsiya, Seriya 2, 1988, vol. 22, No. 9, pp. 30–32 (Translation).

*Primary Examiner*—Raymond J. Bayerl
*Attorney, Agent, or Firm*—C. A. Phillips

[57] ABSTRACT

A data entry and error embedding system in which, first, a document is bitmapped and recorded in a first memory. Then, it is displayed, and portions of it to be replicated by data entry are underlayed by a window, into which window replicated data is entered in location and size such that it is juxtaposed just below that which is replicated, enhancing the accuracy of replication. Second, with this format in place, selected portions of the replicated data are altered by the insertion of character or word substitutions, thus the embedding of errors. Finally, a proofreader would endeavor to correct the error embedded data and a record of his or her changes recorded. In this manner, the skill level of the proofreader and accuracy of the data are computed.

21 Claims, 10 Drawing Sheets

DATA ENTRY AND ERROR EMBEDDING SYSTEM

Matter enclosed in heavy brackets [ ] appears in the original patent but forms no part of this reissue specification; matter printed in italics indicates the additions made by reissue.

*This invention was made with Government support under contract NAS8-37407 awarded by NASA. The Government has certain rights in this invention.*

FIELD OF THE INVENTION

This invention relates generally to systems for improving data entry and proofreading efficiency and particularly to a system which applies digital image scanning in combination with digital graphics as a means to achieve juxtaposition with respect to data entry and proofreading, and which further intelligently embeds errors as a statistically verifiable means to provide operator feedback and monitor operator data entry and proofreading performance.

BACKGROUND OF THE INVENTION

Data entry and proofreading tasks are a necessary pan of almost all business endeavors. Thus, for example, business records must be kept, bills prepared, and reports drafted. These require data of some form to be entered, often by a human into a computer, and subsequently proofread for accuracy. The process of data entry is usually performed by a person possessing highly developed finger motor skills but can also be accomplished by unskilled personnel using manually notated keypunch cards or direct data entry via a keyboard. By such, data is converted from almost any originating form into a computer readable representation, which is usually in the form of conventional ASCII computer codes.

After data entry, proofreading is a follow-up process to verify data accuracy and involves one or more data verification cycles. Each data verification cycle consists of a single visual pass of a given text segment, often a line, whereby the data is checked and compared for accuracy from memory or from a prior text. Data entry and proofreading may be accomplished by the same or different personnel and closely sequential or at separate times.

As is well known, data entry and proofreading are often tedious and time-consuming tasks. In one prior attempt to improve data entry, described in U.S. Pat. No. 3,631,396, issued on Dec. 28, 1971, to Spertus, a transparency is made of an original document and the transparency is projected onto the surface of a video display screen. The document is then read from the screen and entered by a human into a word processor or computer which would display the entered version of the document in juxtaposed format on the display screen. As described, the only method of juxtaposition between the original on the transparency and entered text was by physically varying the distance between the projector and screen, an obviously cumbersome, expensive, and slow process. Problems of character font sizing and spacing were not particularly addressed.

With respect to proofreading, it is acknowledged that computer processed comparison of related documents has been previously accomplished as disclosed in U.S. Pat. No. 4,807,182, issued on Mar. 12, 1986, to Queen, but no process for evaluating or enhancing the capability of the proofreader is known to have been meaningfully addressed.

SUMMARY OF THE INVENTION

In accordance with the present invention, a system includes a document scanner which electronically detects the contents of a document. A microprocessor then places a bitmap image of the document in memory A and displays it along with a controllable window below or above a discrete portion of the displayed document, e.g., line of text of the document. Typically, this line of text would contain, for example, a handwritten entry, which is to be read and accurately electronically recorded in a memory B as an insert with respect to the document. To accomplish this, an operator would read the handwritten entry and would electronically enter it, as by a keyboard; and then directly or from memory B, it would appear in the window adjacent to its read source, enabling more accurate replication. Beyond this, and as a particular function of the invention, the accuracy of replication is further enhanced by effecting a near identity of sizing, horizontal, or both horizontal and vertical sizing as between the original and replicated entry.

As a further future of this invention, the system would provide evaluative data with respect to a data entry/proofreading operator who would be presented a workpiece such as the filled-in document as displayed from memories A and B. This process is enhanced by taking the entered text of memory B and revising it by placing in it certain computer-embedded errors, for example from a memory C, which would include for later use the locations and types of errors embedded. The now error-embedded entries would be placed in memory D, and from it they would be displayed in a window with the pictorial image of the document from memory A. A proofreader would then operate a keyboard to correct any observed errors between the original document and the revised entries. A replica of the proofread and, now, corrected entries would be stored in memory E. The corrections made by the proofreader which are not responsive to embedded errors are counted by a digital processor unit and recorded in memory F as found data entry errors. Next, by comparing the inserted errors now in memory D with corrections of these inserted errors by the proofreader as reflected by the corrected text in memory E, the inserted, found and not found errors are identified and registered in memories G and H, respectively. An estimate of the remaining data entry errors made by a data entry operator is determined by multiplying the number of found data entry errors from memory F by the ratio [U/100-U] *U/(100-U)* where U is in percent and determined by the number of unfound embedded errors in memory H divided by the total number of embedded errors in memories H and G. They would then be stored in memory I. A revised text is created by removing any unfound embedded errors of memory H from memory E. This text is stored in memory J as the text output of the data entry and proofreading process.

DETAILED DESCRIPTION OF THE PREFERRED EMBODIMENT

Figure 1:
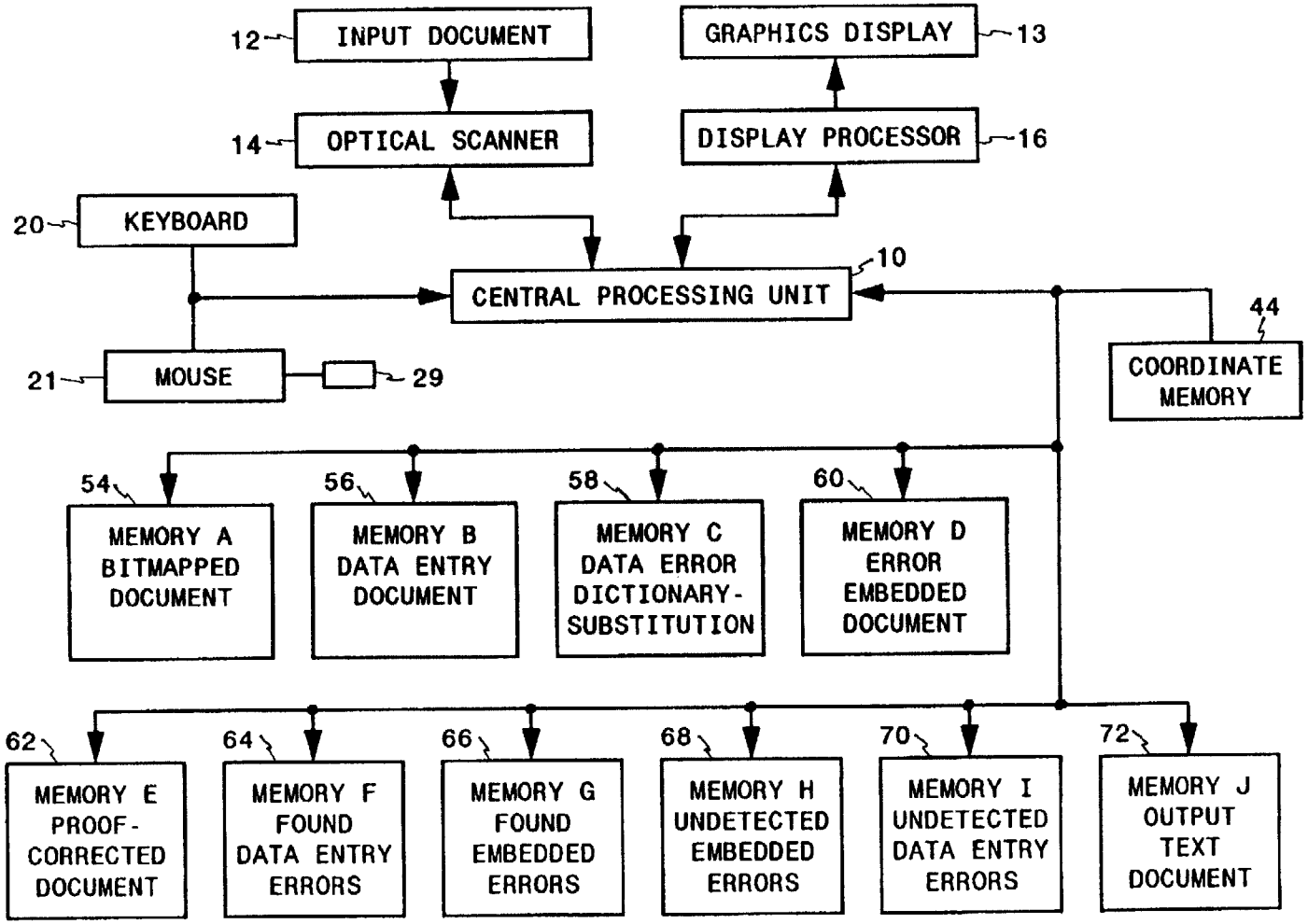
FIG. 1 is a block diagram of the apparatus of the invention.
Figure 2:
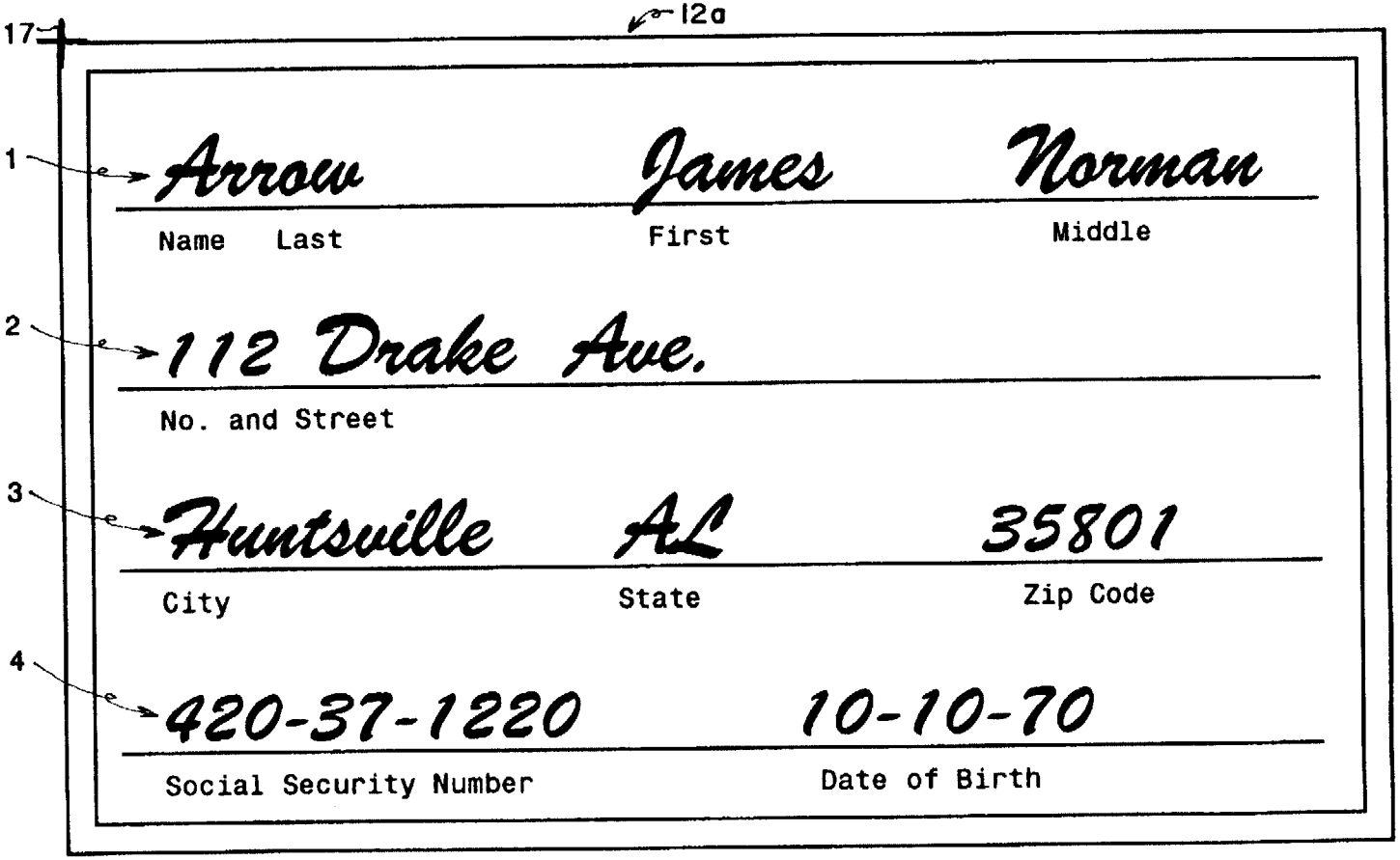
FIG. 2 is an illustration of the input document.

Referring to FIG. 1, under the control of central processing unit (CPU) 10, an input document 12 is scanned by a conventional full-page optical scanner 14. CPU 10 then extracts from scanner 14 a binary bitmapped replica of document 12 wherein, for example, the presence of a "1" bit indicates the presence of a pixel, or dark area, and a "0" bit indicates the absence of a pixel, or light area. In this instance, bitmapped document 12a is a form having lines 1 thru 4 which have been filled in with handwritten entries, as shown in FIG. 2. As an example, the bitmap resolution is assumed to be 150 pixels per inch. Thus, each 150th-by-150th square inch of document 12a is identified by an X-Y coordinate location and determined to be white or black. With this information, CPU 10 stores the document in memory A at discrete X-Y coordinate locations serving as addresses for each pixel position of the document. As a point of positional reference, it will be assumed that point 17, in the upper left-hand corner of bitmapped document 12a (FIG. 2), is at the location where the X location is zero and the Y location is zero, or location $X_0$–$Y_0$ as a discrete assigned address by CPU 10.

CPU 10 and display processor 16 are cooperatively configured by software for word processing in general and for graphical manipulation of entered data, the manipulation being in terms of pixel locations as described. As one function, display processor 16 converts the bitmapped image supplied to it by CPU 10 from memory A 54 into a video signal and supplies it to graphics display 13, replicating *a plurality of characters of document 12 as shown in* FIG. 2.

Juxtaposition

Figure 3:
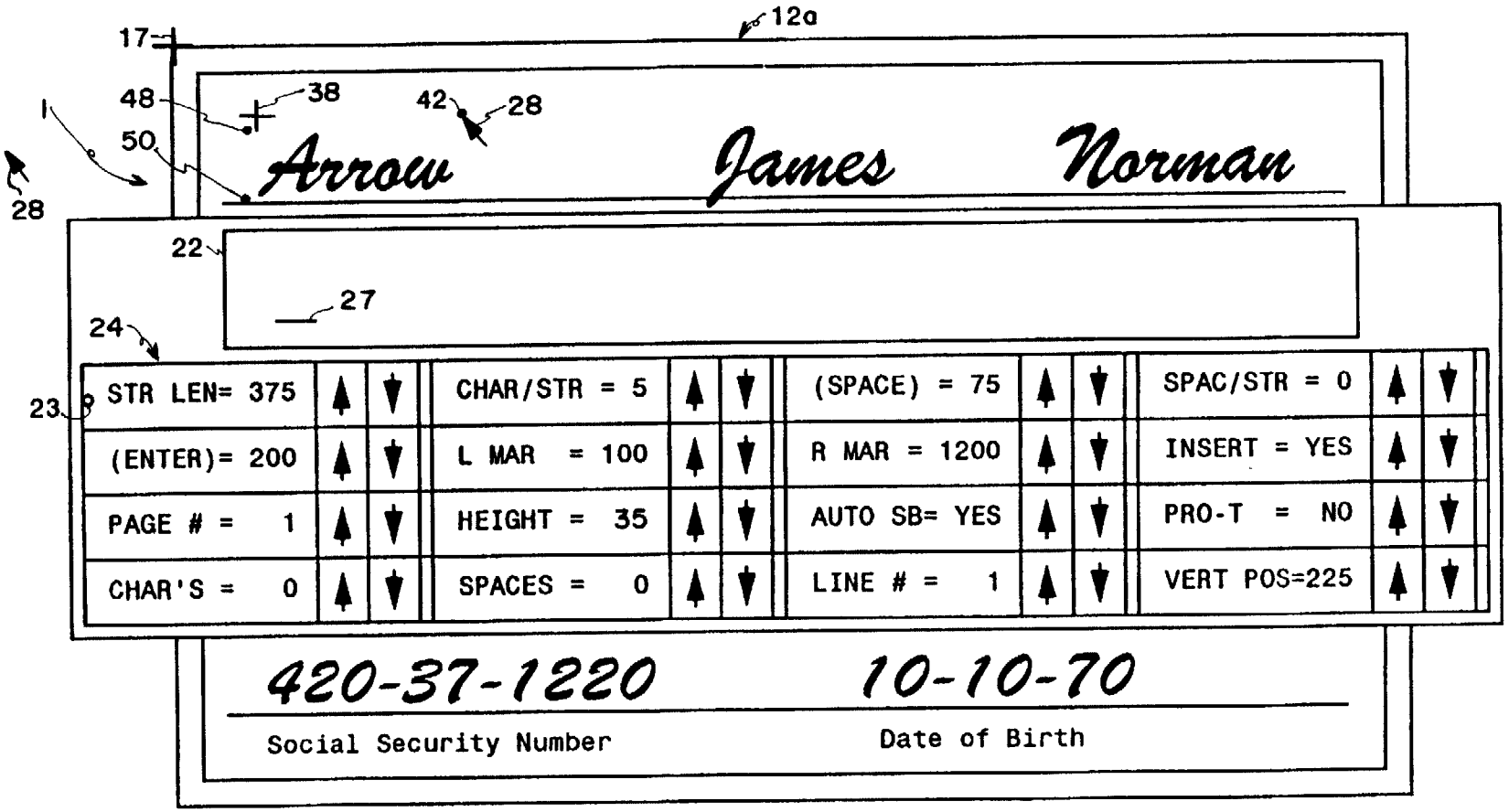
FIG. 3 is an illustration of the bitmapped input document as the background window with measurement points and overlaid foreground data entry window.

An initial and basic role of the invention as illustrated is to provide a display system wherein data entry, via keyboard 20, of the handwritten portion supplied from document 12a, is displayed on display 13, as entered, adjacent to its appearance in the document. To accomplish this, CPU 10, responsive to a selected keystroke or keystrokes, together with display processor 16, overlays a movable data entry window 22 and parameter window 24 just below line 1 of document 12a (FIG. 2), as shown in FIG. 3, being displayed on display 13. In this example, the operator's task is to first read the handwritten entry on line 1 and to type, via keyboard 20, what is read. In this instance, the entry to be made from line 1 is actually three entries, being the last, first, and middle name of a person. The object of the system is to simply and expeditiously cause the typed entry to be appropriately juxtaposed and scaled with the coordinately displayed handwritten entry. Location and sizing of the entry is based upon the locational arrangement described above where each point on document 12a is assigned a discrete X-Y coordinate position.

As stated above, point 17 is fixed as a reference. Such a reference is established by initially moving mouse 21 to move mouse cursor 28, across to point 17. This reference position is then entered by operating mouse button 29 of mouse 21. Reference point 17 could default, for example, to the upper left corner of the associated bitmap if so desired. Thereafter, any movement of cursor 28 by mouse 21 causes CPU 10 to register an X-Y coordinate value identifying its relative position with respect to point 17 and to detect instruction, measurement, or command, as will be further described.

The interpretation and command functions from operation of mouse 21, and thereby mouse cursor 28 is effected through parameter window 24 over document 12a just below data entry window 22 as shown in FIG. 3. The parameter to be manipulated is chosen by first moving mouse cursor 28 within a parameter block e.g., STR LEN=and pressing button 29 of mouse 21. Then, the mouse cursor would be moved to the "up" or "down" arrow of that parameter. A parameter is incremented (or decremented) by clicking the mouse button 29 while mouse cursor 28, appearing as an arrow, remains positioned over the associated up or down arrow. One click will result in the selected parameter being incremented or, alternately, decremented by one pixel or 1/150 of an inch. Holding the mouse button down will result in the parameter being continuously incremented or decremented until the mouse button is released.

The 16 parameters displayed within parameter window 24 are described as follows. The string length parameter (STR LEN =) denotes the length of a selected sample word, words, or line (selected from the text in the background document 12a ) in pixels. Moving along the same row and to the right, the characters per string (CHAR/STR =) parameter displays the number of characters in the selected sample string. The space parameter (SPACE) denotes the length of a space in pixels. The space/string (SPAC/STR) parameter denotes the number of spaces (or blanks) in the selected sample.

Moving down to the second row of parameters, the enter parameter (ENTER) denotes the number of vertical pixels which data entry window 22 is moved down the screen with each press of the return (ENTER) key of keyboard 20. This can be adjusted as necessary for different vertical line spacings or vertical measurements. This also allows data entry window 22 to follow down the page the displayed document 12a , which may also be regarded as a background window. In this manner, juxtaposition is maintained as data entry window 22 is moved down the page with each return key press. Moving to the right, the left margin parameter (L MAR =) displays the current position of the left margin in pixels. Similarly, the right margin parameter (R MR =) displays the position of the current right margin in pixels. Lastly, at the extreme right of the second parameter line, the insert parameter (INSERT =) denotes the current status of the insert mode, which functions in a manner identical to the insert mode of a conventional word processor.

Moving down to the third row of parameters, the page number parameter (PAGE #=) denotes the current document, background, page number, etc. Moving to the right, the height parameter (HEIGHT =) displays the height of a character in a data entry in terms of pixels. The auto space parameter (AUTO SB=YES/NO), when enabled, automatically makes the space characters or blanks horizontal dimensions equal to the horizontal dimension of a character. The space character is, of course entered by the space bar. Moving again to the right, the proportional type parameter (PRO-T=YES/NO), when enabled, provides for the variable spacing that is characteristic of proportional type. When not enabled, the usual fixed character spacing is employed.

Moving down to the fourth row of characters, the number of characters per line parameter (CHAR'S=0) displays, as the name implies, the number of characters per line. This parameter is displayed for informational purposes only and may not be incremented or decremented by the user with the mouse cursor. Moving to the right, the number of spaces per line parameter (SPACES=0), again, as the name implies, denotes to the user the number of spaces found on the current text line. Similarly, this parameter is display-only and may not be modified by the user. Again, moving to the right, the line number parameter (LINE #=) denotes the current line position of data entry window 22. Lastly, the vertical position parameter (VERT POS=) denotes the vertical location of data entry window 22, in pixels. The operation and control of parameters is effected by CPU 10 in conjunction with display processor 16 in a conventional manner.

In accordance with one illustration of this invention, the handwritten word "Arrow" in line 1 is to be replicated in print in data window 22 such that it appears just below a line of text entry of document 12a (FIG. 2), which text entry is illustrated in the form of background. Thus, the two would be adjusted to be horizontally, or horizontally and vertically, in conformity. The first step is to move mouse cursor 28 (FIG. 3) such that it is moved to the STR LEN block of parameter window 24 and mouse button 29 depressed. This indicates to CPU 10 that a horizontal string length is to be determined. In one example, string length can be set by moving cursor 28 to one of the adjacent increase or decrease arrows as needed and button 29 depressed to establish or change a string length, where the characters in data entry window 22 function as indices of a measurement scale. The associated value will appear as a number (of pixels) in the STR LEN block as shown. For example, string length would be the length of the word "Arrow."

Alternately, after first commanding the string length parameter as described, cursor 28 would be employed in making direct measurement of "Arrow," in which case, after moving the cursor to the STR LEN parameter as described, and this parameter identified, the cursor would be moved to the beginning point, in this case, point 38, adjacent to the word "Arrow" (FIG. 3). The mouse button is then clicked, and CPU 10 responsively causes there to appear at point 38 a reference indicator, a cross as shown. Measurement of the word "Arrow" is then effected by CPU 10 by moving the mouse to the right while its button is depressed until the mouse cursor is moved to point 42, the end of "Arrow." The mouse cursor button is then released, causing a horizontal pixel measurement to be computed by CPU 10 which in turn causes this measurement to be recorded in coordinate memory 44 and to appear in STR LEN block of parameter window 24.

Next, the number of characters in "Arrow,"[0] five, is entered [into] *in* CPU 10 via CHAR/STR parameter. To accomplish this, mouse cursor 28 would be moved into the CHAR/STR block, mouse button 29 pressed, and by this, the active parameter indicator 23, a circle, would be moved to within CHAR/STR block. Next, after moving the mouse cursor 28 appropriately to the up and/or down arrow position, the mouse button is depressed, causing the numeral in CHAR/STR block to increment and/or decrement until the desired numeral appears in this block. CPU 10 is programmed to divide the measured pixel length of "Arrow" by the number of characters to thus provide an average character length which is recorded in coordinate memory 44 and would be provided to display processor 16 as a horizontal scale, for example, 75 pixels per character. Since there are no blanks in the work "Arrow," it is necessary to set the spaces per string parameter to zero.

Figure 4:
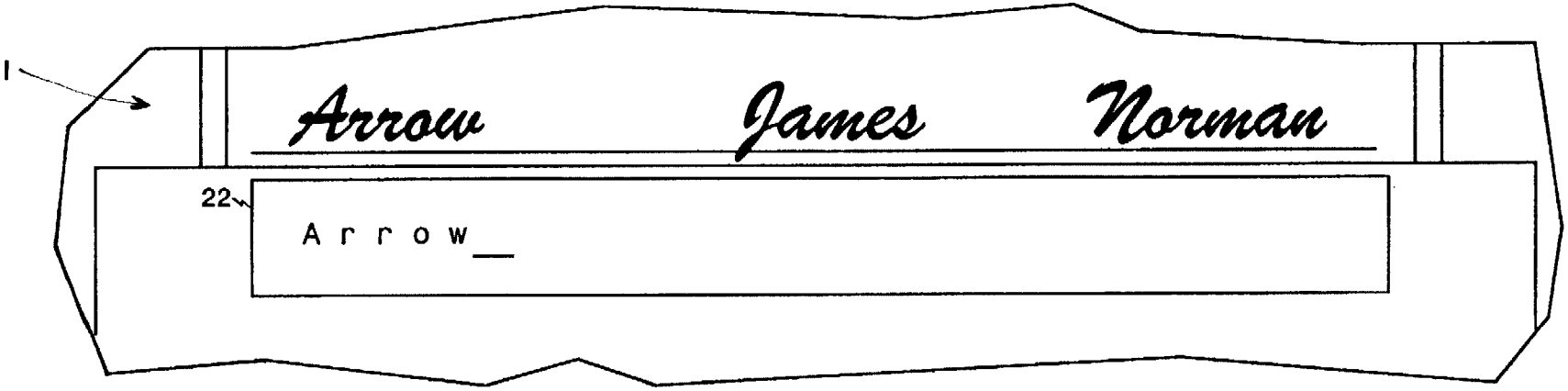
FIG. 4 is a cut-away illustration of the background bitmap window and the foreground data entry window with sized and scaled "Arrow."

If no vertical adjustment is to be effected, the word "Arrow" would be typed just above text cursor 27 and would be simply horizontally expanded by display processor 16 as per the horizontal width of the handwritten "Arrow" previously stored in coordinate memory 44. As shown in FIG. 4, the typed word in data entry window 22 would be vertically aligned with the handwritten "Arrow," enabling an enhanced comparison and thus enhanced accuracy of keyboard entry. The entry is recorded in ASCII format in data entry memory 56 and appears in window 22.

The additional function of appropriate vertical sizing may be effected automatically by display processor 16, it being programmed to cause an increase in vertical size in accordance with a selected ratio from the process of increased horizontal size of character as described above. This may be accomplished by a lookup table approach wherein with a selected width chosen of CPU 10, the latter provides a proportional height.

Vertical sizing, however, may be determined by a vertical measurement of the handwritten "Arrow," this being illustrated in FIG. 3. Thus, for example, first, mouse cursor 28 would be moved to the "height" block of parameter window 24 and mouse button 29 clicked, indicating to CPU 10 and display processor 16 that a height measurement is to be made. Next, the mouse cursor would be moved up to point 48, the mouse button pressed, whereby a cross (not shown) would appear at point 48. Then, the mouse button would be held depressed and the mouse cursor 28 (not shown) moved downward to the lower level of the letters [or] *of* "Arrow" to point 50, the mouse button released, whereby there is provided CPU 10 a vertical pixel measurement from point 48 to point 50. This measurement, for example, 75 pixels, would be recorded as a height value in coordinate memory 44 and displayed as a number in the height parameter of window 24.

Figure 5:
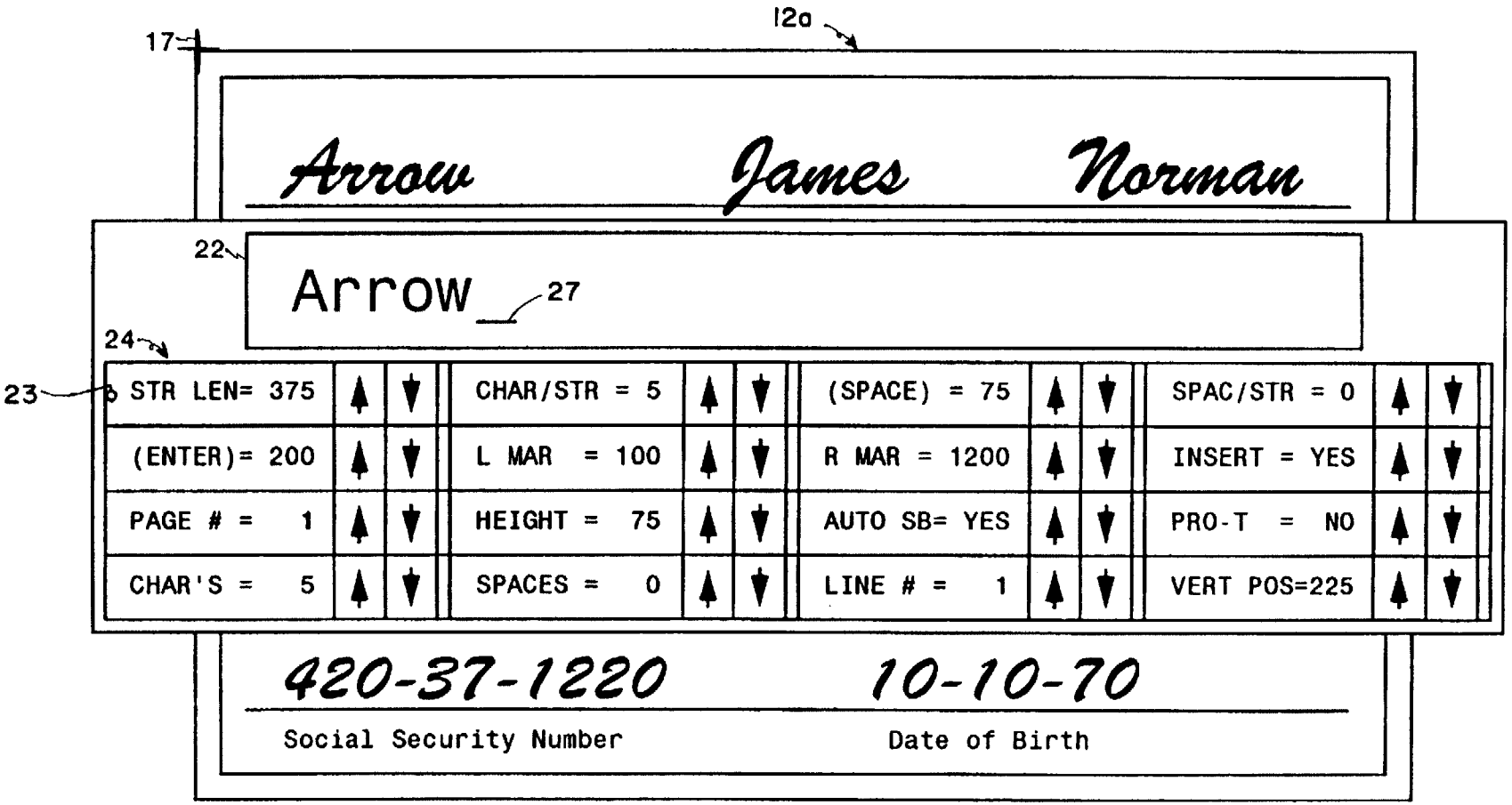
FIG. 5 is an illustration of the bitmap window and the data entry window with sized and scaled "Arrow."

With both horizontal and vertical dimensions precisely determined as described, upon the entry via keyboard 20 [or] *of* "Arrow," there will be an enhanced data record, and when entered by keyboard 20, "Arrow" would appear in data window 22 quite precisely in size and location in conformance with the handwritten "Arrow," this being illustrated in FIG. 5.

Alternately, the bitmapped document may be scaled or zoomed in the horizontal and/or vertical dimension and varied in position, all with respect to the data entry window so that the characters and spaces of the bitmapped document conform in size and location to that of the characters and spaces in data entry window 22.

Figure 6:
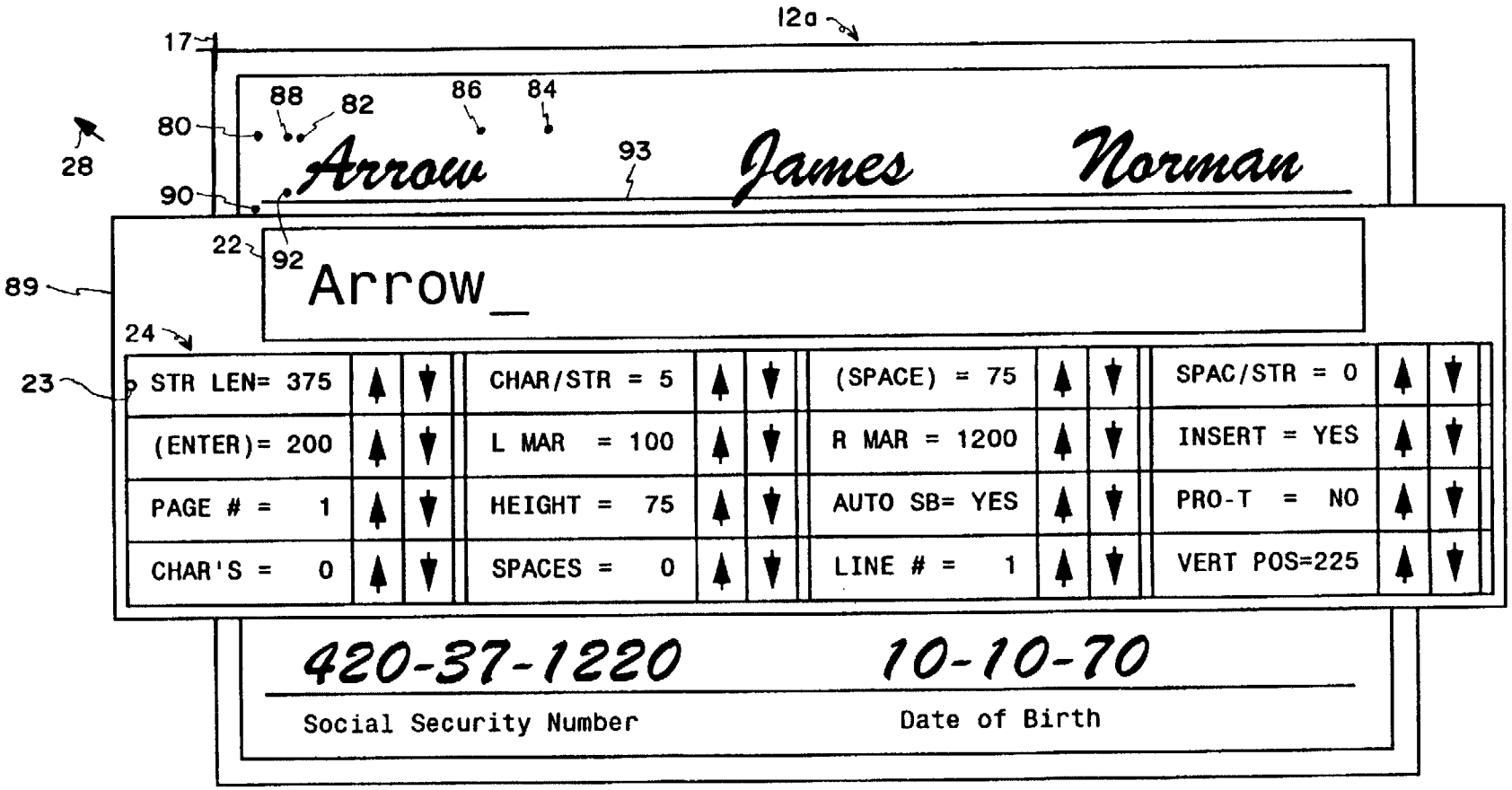
FIG. 6 is an illustration of the bitmap window with reference points and the data entry window with sized and scaled "Arrow."

As a further feature of this invention, illustrated in FIG. 6, the boundaries used in location and sizing are determined, partially or completely, automatically. As a first step, the beginning of a string, e.g., the word "Arrow" would be determined. To accomplish this, coordinate memory 44 would be referenced for a known clear point 80, having previously been entered by positioning mouse cursor 28 by mouse 21 and depressing button 29 of mouse 21 or other programming means, such as, from automatic scanning of document 12a via memory A, such a clear point would be located and available from coordinate memory 44.

Next, CPU 10 is programmed to commence a vertical line scan of bitmap memory A, as illustrated by FIG. 6, moving between selected vertical Y limits illustrated as points 80 and 90, having been previously entered in coordinate memory 44. Next, line scanning is effected from point 80 to the right, searching for a ['] "1[']" bit response, thus detecting that document 12a presents a dark area, indicating the commencement of an insertion, such as the horizontal commencement of the word "Arrow" as illustrated by point 82 where the coordinate X, for example, =300. CPU 10 is set to detect a dark area when a dark state or [']"1[']" is sensed in three sequential vertical scans between the vertical levels marked by points 80 and 90. Such position is then recorded in coordinate memory 44. The scanning and thereby horizontal location of point 82 may be instituted by a single keystroke, such as "tab," whereby the X coordinate for the beginning of the handwritten word "Arrow" of line 1 may be automatically located.

Such location of a commencement point may be employed in at least one of two ways. First, by the tab stroke, data entry is set to commence in data entry window 22 at a corresponding horizontal location, for example, at 82, the horizontal beginning point for typing in "Arrow" and horizontal expansion to the right effected as discussed above.

Where it is desired to effect a more precise automatic positioning and dimensioning before a data entry, a reverse or left scanning would commence, for example, at point 84 for the detection of the appearance of a [']"1[']" bit or dark area in, for example, three successive scans. At the point of appearance as an X coordinate, at point 86, this X coordinate point would be stored in memory 44. Alternately, point 86 could be located from the left from point 82, scanning continuing to the right until an all-white condition was noted in, for example, three successive scans to thus determine point 86, the end of "Arrow." In one or these fashions, a precise horizontal width of the handwritten "Arrow" is detected and placed in memory 44.

Automatic vertical locationing may be accomplished essentially as described for horizontal determination. Thus, by moving cursor 28 to point 80, CPU 10 would be instructed to cause there to be horizontal line scanning for a predetermined length, say, from point 80 to point 84 and scanning proceeding downward until there is a detection of a dark area in, for example, three sequential scans, this then marking the top of the word "Arrow" at vertical level point 88. Next, cursor 28 would be moved to a reference point below the word "Arrow," as, for example, at a point 90 above the general upper position of the next line of print and then scanning upward, as shown, until there is detected a dark area in three successive scans at point 92. It is assumed here that line 93 is undetected as being of less than three pixels in height or has been removed from the bitmapped memory 54. Alternately, scanning may be downward from point 88 until a light area is detected.

Reference points 80, 84, and 90 may be retrieved from coordinate memory 44 as in the case of horizontal and vertical point locations. By this approach, the Y position of the top and bottom of characters of "Arrow" is determined and stored as coordinates in coordinate memory 44. Once determined, the coordinates of the resulting rectangle are stored in coordinate memory 44.

Having located and stored in terms of X–Y coordinates the desired position and expanse of "Arrow," with the typing of this word, CPU 10 determines the number of characters in it, as by counting the number of keystrokes pressed to type "Arrow" or by using known optical character recognition algorithms on the bitmap of "Arrow." Then, by division of the horizontal expanse of the data entry from coordinates in coordinate memory 44, the horizontal size of characters is determined by CPU 10. The vertical size is, of course, the result of the direct vertical measurement as described. As spaced and sized, the entry of "Arrow" is now stored in a data entry memory 56, carrying an address in terms of its line position, size, and line number, line 1 as shown.

Next, whether by manual measurement or automatic control, the process would be repeated for the other two entries of line 1, and the resulting data stored in data entry memory 56. Following this, data window 22, along with parameter window 24, would be moved downward in unison as a window unit 89 to be just below line 2 (FIG. 7), and the process of measurement and entry would be repeated for lines 2, 3 and 4.

Figure 7:
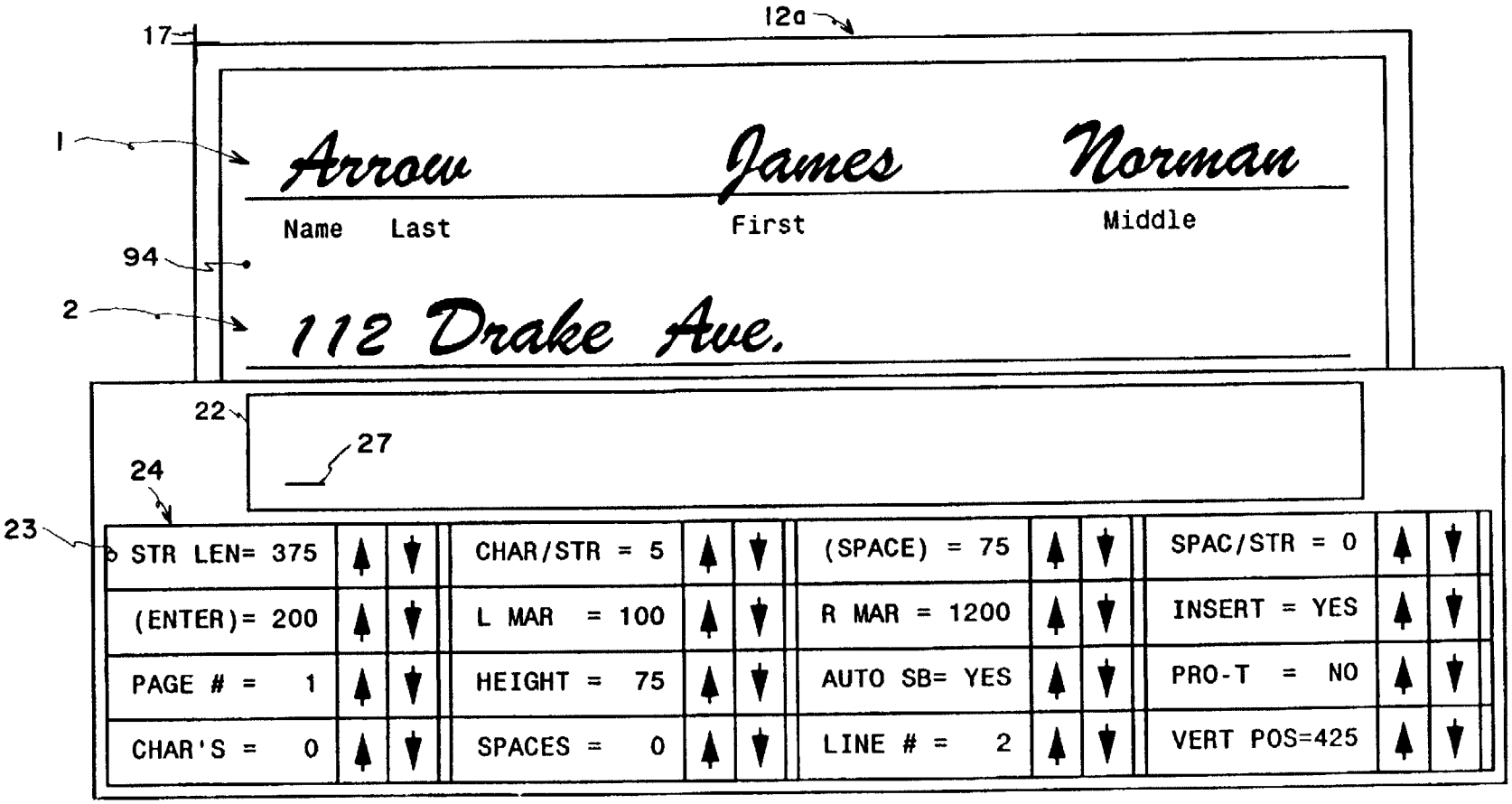
FIG. 7 is an illustration of the bitmap window and the data entry window on line number 2.

The vertical positioning of data entry window 22 for successive lines of text can be accomplished through automatic vertical locationing. For instance, after a press of the return key on keyboard 20, CPU 10 would be instructed to cause a horizontal line scanning for a predetermined length, say, equal to that between points 80 and 84, as shown in FIG. 6, and scanning downward from point 94 (FIG. 7) until there is a detection of a dark area in, for example, three sequential scans and a following light area in, for example, three sequential scans, this then marking the bottom of the next line where the top of the data entry window 22 would be positioned as shown in FIG. 7.

Another example of automatic vertical locationing is that the discrete X–Y points indicating the position and margins [or] *of* text entries are stored in coordinate memory 44 as would be appropriate for a form where text entries remain in approximately the same place between forms of the same type. During positioning of the data entry window 22, CPU 10 would reference this memory 44 to place the data entry window 22 at the appropriate location for lines of data.

Proofreading

As indicated in the Summary of the Invention, a significant aspect of the invention relates to the process of proofreading. By way of a quite simplified example, proofreading is discussed in terms of the bitmapped document 12a and data entry memory 56, the data entries made to document 12a being illustrated as a whole in FIG. 8. As will be noted, the data entry operator has made two errors in line 1: an "n" in "James" and an "i" in "Norman."

The proofreading procedure would, in this illustration, take maximum advantage of the juxtaposed data window system as described. Thus, in FIG. 9, the bitmap of the input document 12a from bitmap memory 54 would be displayed, and the proofreading window 25 would show the juxtaposed and sized replication of the copied original entry from data entry memory 56 whereby the proofreader is aided in checking the accuracy of the data entries; and where errors are detected, the proofreader would effect correction by the same hardware, a data entry terminal, as employed by the original data entry operator. Of course, the proofreader may be the same person as the original data entry operator or a different person and, typically, the proofread document would be longer and typically varying in complexity.

Figure 8:
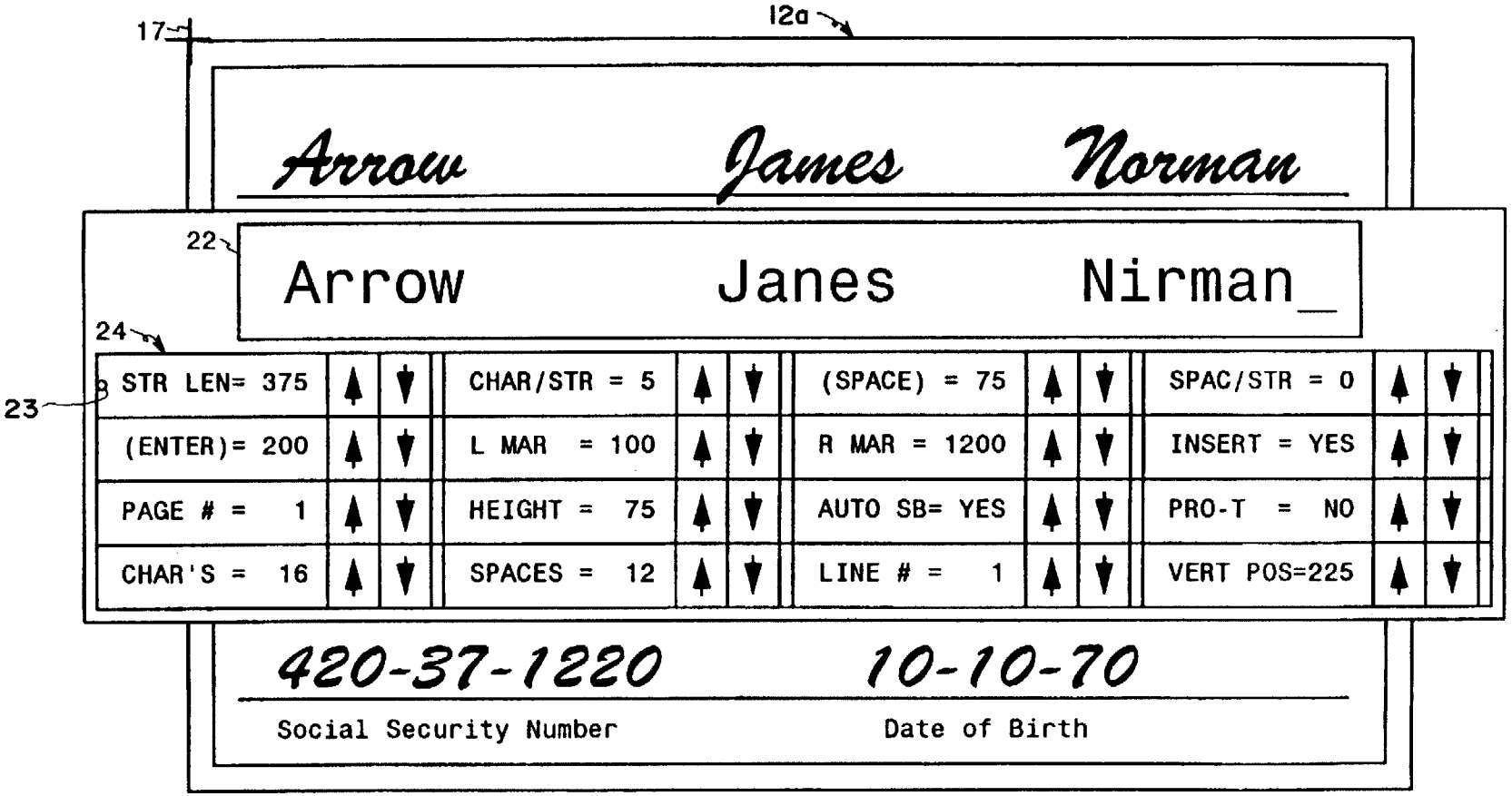
FIG. 8 is an illustration of the bitmap window and the data entry window with a completed line number 1.
Figure 9:
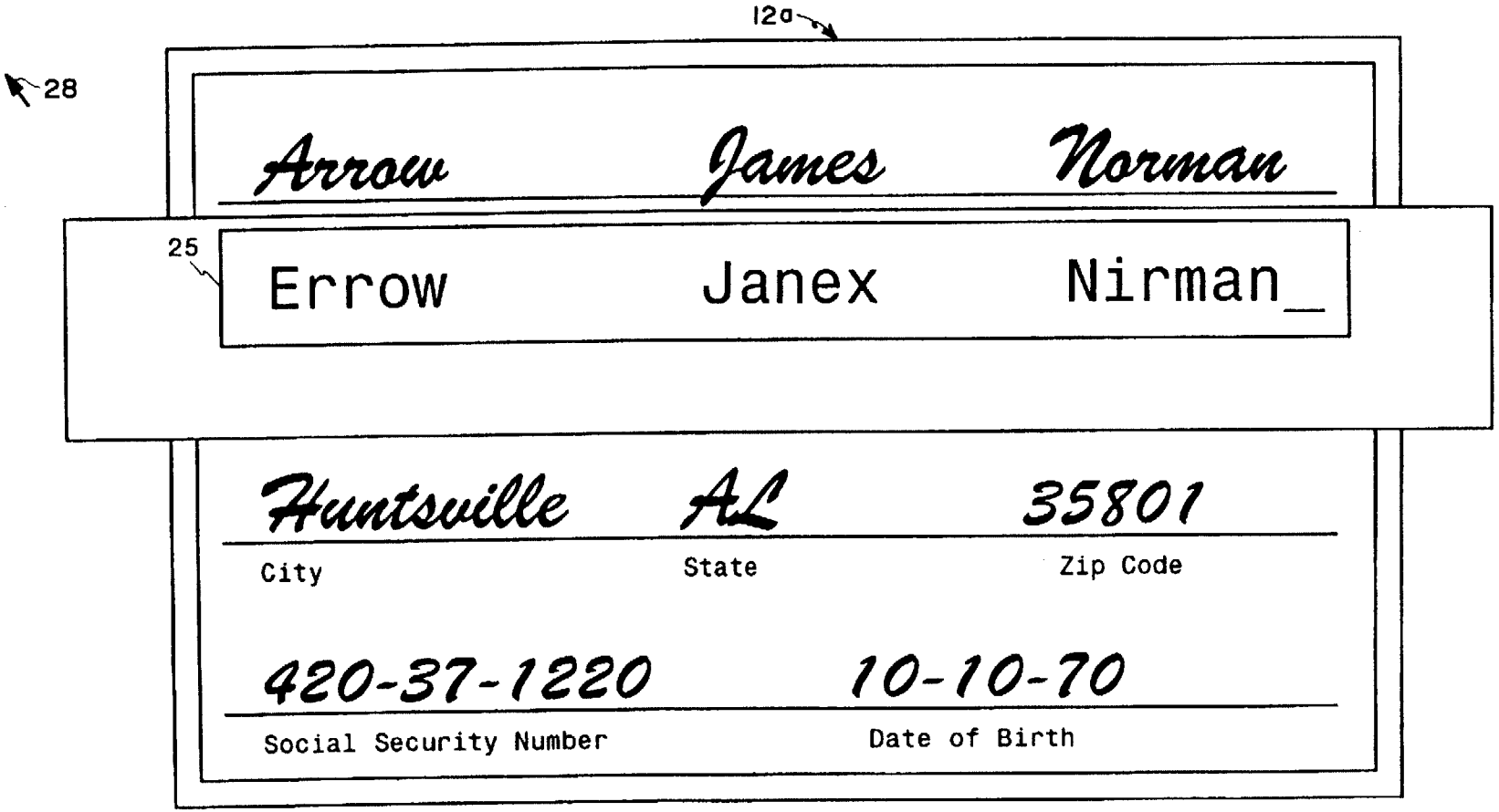
FIG. 9 is an illustration of the bitmap window and the proofreading window.

In accordance with this invention, an analytical tool is provided for the proofreading process by the known implantation of certain errors in the workpiece. Here, they will be with respect to the data entries which are shown in FIG. 8, again, by way of a quite simple illustration. Thus, in the present case, CPU 10 in conjunction with data error dictionary-substitution memory 58 proceeds to modify these data entries by substitution. With respect to FIG. 8, CPU 10 is programmed to randomly select zero or more character element positions in terms of discrete character positions, in discrete lines of the data entries shown therein for replacement. Thus, for example, CPU 10 would extract from memory 56 a character, say, the first character of line 1, for replacement. As shown in FIG. 8, this is the letter "A." Then, data error dictionary-substitution memory 58 would be addressed with the letter "A," for example, would find a matching element in the set A–Z, and would respond from such address with a set of characters, for example, B–Z, for "A." Then randomly, CPU 10 would select one of these characters, for example, "E" to replace "A," as shown in FIG. 9. The process would continue for other lines of entries until there has been substitutions in the entered text of memory 56 for a selected number of characters, with the final error embedded entries placed in error embedded memory 60 and shown in FIG. 9 with input document 12a and proofreading window 25. For further illustration, the "s" at the end of "James" has been replaced through error embedding by an "x." It is thus to be noted that we now have for recall both the original entries in memory 56 and error embedded entries in memory 60. In addition, the number and location of implanted errors are also recorded in an error embedded memory 60.

It is to be appreciated that in addition to character (letter or number) replacement as described, error implantation may be made of different forms, e.g., transposition of characters, upper/lower case changes, missing characters, or added characters. Numbers may, of course, be similarly treated. Further error embedding may be extended to word errors, taking into account, or considering, rules of grammar and/or meaning of words. For our consideration here, it will be assumed that character errors have been implanted as shown in FIG. 9.

To now consider the proofreading process, it will be assumed that the first line of entered text with embedded errors will be brought out from memory 60 and placed in proofreading window 25 by CPU 10, juxtaposed and sized from previous data entry phase as illustrated in FIG. 9 and so displayed (for line 1) to the proofreader.

Figure 10:
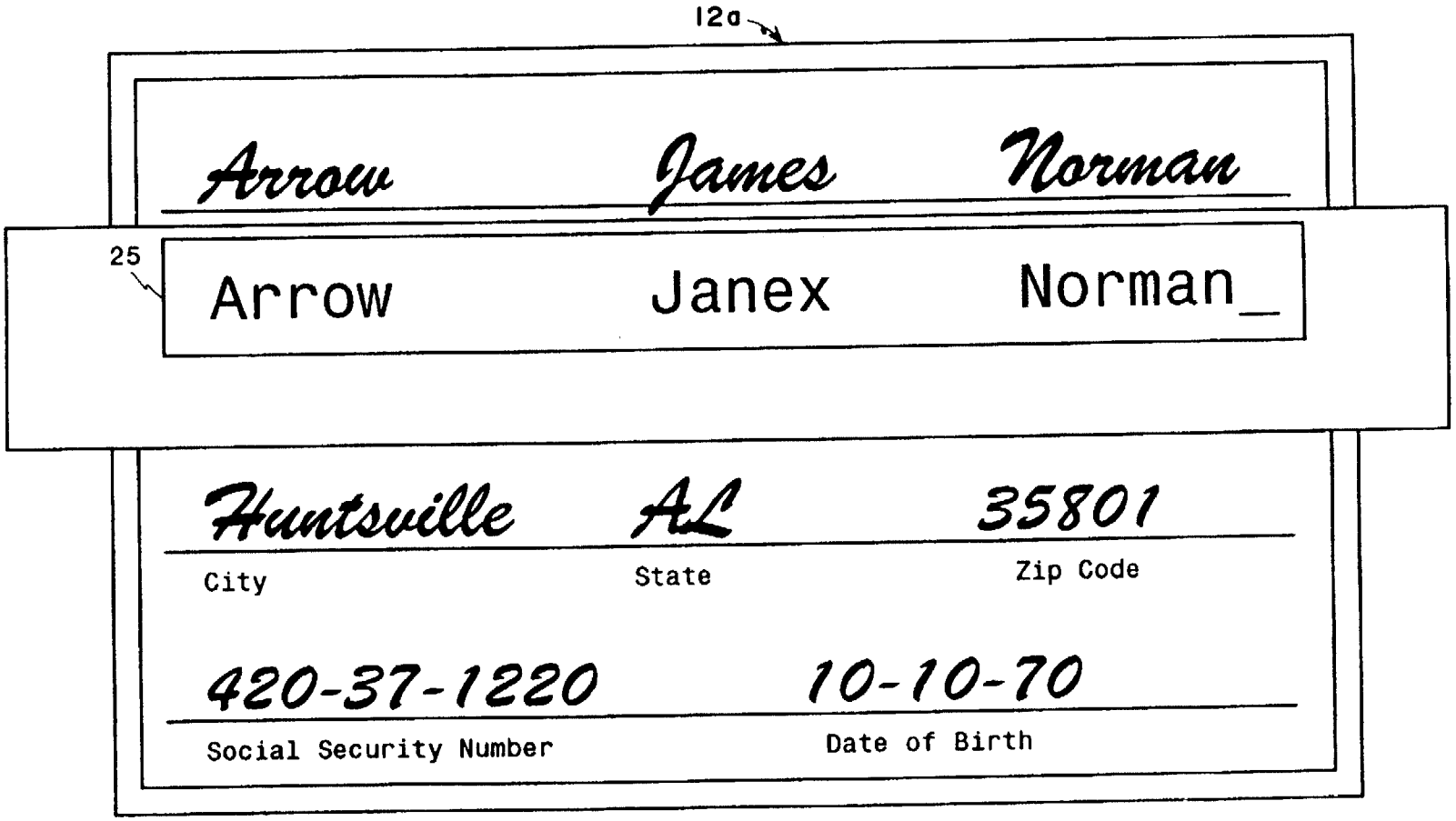
FIG. 10 is an illustration of the bitmap window and the proofreading window after a proofreading cycle.

As stated above, the proofreader would have the same assists as the data entry operator [t] *to* enter and change text, that is, to enable finding and correction of errors, this being via the implements of mouse 21 and keyboard 20. Thus, the proofreader would compare the original and entered text and make such corrections as are observed necessary. This, of course, would be done on a line-by-line basis as described for data entries, and it will be assumed that at the end of the process, the text has been revised and recorded in proof-corrected memory 62 and as shown in FIG. 10. As will be noted, by comparison of FIG. 10, all of the errors have been caught and corrected except for the substituted letters of "n" and "x", being character numbers 3 and 5 in "James". Thus, in this example, the proofreader has examined 16 characters, has found and corrected 1 data entry error and 1 embedded error, and left 1 data entry error and 1 embedded error, respectively. Such comparison would normally be effected by CPU 10, programmed accordingly with the results recorded in found data entry error memory 64, found embedded error memory 66, undetected embedded error memory 68, and undetected data entry error memory 70. The results for undetected data entry error memory 70 are estimated as CPU 10 does not know what is the correct ASCII text in the original document. A computation of the errors remaining versus the errors found may be machine determined by a straightforward comparison in CPU 10 for analysis. Alternately, only the fact or presence of an error would be registered in memory 62 rather than a corrected text.

While the illustration has been greatly simplified by showing only 1 line for embedding, it is to be appreciated that in a document having many pages and varying in complexity, significant data would be accumulated for analysis of probable errors. Thus, an important interpolation can be made as to probable remaining real data entry errors that might have been made in a document having many pages and varying in complexity. Beyond this, such an interpolation may be employed to relatively identify portions of an extended text which may be regarded as requiring an additional proofreading pass as revealed from a like complex portion of a document as described whereby proofreading of an entire document may be avoided. The same concept may be extended to provide a reliable guide to the proofreading of a large document to a predetermined level of accuracy.

The error computations are as follows. The proof-corrected text in memory E 62 is examined and compared against the embedded error text in memory D 60 to catalog found real data entry errors, found embedded errors, and undetected embedded errors. Any corrections made in memory E 62 that do not correspond to the embedded errors of memory D 60 are cataloged, listed and number of errors recorded, as found real data entry errors in memory F 64. The embedded errors of memory D 60 are compared with memory E 62 to determine if they were found or undetected. Found embedded errors are cataloged, listed and number of errors recorded, in memory G 66, and undetected embedded errors are cataloged, listed and number of errors recorded, in memory H 68. The undetected embedded errors of memory H 68 are removed from memory E 62 to crate a revised output text document which is stored in memory J 72.

An interpolation is performed that assumes that the following equation holds true because embedded errors should be found at the same rate as real errors provided the types and distribution of embedded errors mimic those of real errors.

$$\frac{\text{\# of real errors undetected}}{\text{\# of real errors found}} = \frac{\text{\# of embedded errors undetected}}{\text{\# of embedded errors found}}$$

The percent residual error, U, is defined to be the percentage of the total number of embedded errors that remain in the next after a proofreading cycle. Now, the right side of the equation can be replaced by the [ration] *ratio* U/(100-U), and the number of real errors found can be moved to the right side of the equation, or $$\text{\# of real errors undetected} = \frac{U}{100 - U} \times \text{\# of real errors found}$$

The variables on the right side of the equation are easily attainable. The number of real errors found is retrieved from memory F 64. U is calculated by dividing the number of undetected embedded errors in memory H 68 by the total number of embedded errors in memories G 66 and H 68. An estimate of the number of undetected real errors can now be computed, and the results placed in memory I 70. This interpolation can be repeated, taking into account errors of just a specific type to achieve a breakdown of undetected real errors for various types of errors.

For the above example, U equals 50% since 1 out of 2 embedded errors were found, and the number of real errors found equals 1 so the calculation is as follows:

$$\text{\# of real errors undetected} = \frac{50}{100 - 50} \times 1 = 1$$

As a result, an estimate of the number of real errors undetected is determined to be 1.

It has been determined statistically that the number of errors remaining in the data (NE) is proportional to the following exponential decay formula:

$$N e^{-(\lambda \Delta t)}$$

In the above formula, lambda is the decay constant which is representative of a quantified maintained level of attentiveness or alertness. Lambda is a constant, selected according to the complexity of data and performance level of the proofreader. For example, one lambda might be used when character errors are implanted; and a second, differing, lambda might be reserved for word error implantation.

The variable $\Delta t$ in the above formula is defined as the imaging time per character or, alternately, the imaging time per line. This is determined by measuring the time it takes for an individual to scan for errors in a line which contains no errors, embedded or real. In practice, approximately one-fourth of the lines in a given document could be displayed without errors in order to obtain an accurate average. It has been determined that such imaging times are within the range of approximately 10 to 40 seconds. As a feature of this invention, this may be measured as, for example, by CPU 10 sensing the interval of time between carriage returns. Then, if the measured time falls outside of selected limits, such would be provided to signal the proofreader of such.

When the variables in the above formula are suitably averaged, the performance of a person or a group of persons working on a batch of data over several proofreading cycles can be described.

Alternately, the error implantation frequency and error type would be controlled in a dynamic manner by CPU 10 as a means to realize optimum results for a given individual operator at a given time.

We claim:

1. A data entry system comprising: optical scanning means (14) for scanning of a document (12) separate from [each] *said* optical scanning means and providing a bitmapped signal output including (1) discrete pixel signals and (2) coordinate location signals of said pixel signals;

data entry and command means (20, 21, 29) for generating signal data *of a plurality of characters replicated from said document* and command signals;

data control and computation means (10, 16) coupled to said optical scanning means and said data entry and command means (20, 21, 29) for:

(1) receiving as input signals said bitmapped signal output, said generated signal data, and said command signals, (2) providing signals representative of a bitmapped signal output, being signals representative of pixels and geometric locations of said pixels, of a selected portion of said document, (3) providing signals representative of a discrete area, said area being adjustable in relative position with respect to a selected portion of said selected portion of said document, (4) providing *display* signals representative of generated data *of said plurality of characters* from said data entry and command means as data for appearance in said discrete area, and (5) adjusting said display signals for selected location and size of data entered into said discrete area and providing adjustment signals; and display means (13) responsive to said bitmapped signal output of said [date] *data* control and computation means, signals representative of said discrete area, said display signals, and said adjustment signals, for displaying said selected portion of said document, said discrete area, and said display signals.

2. A data entry system as set forth in claim 1 further comprising:

first memory means (54) responsive to said data control and computation means (10, 16) for storing, said bitmapped output of said data control and computation means, output signals representative of pixels and geometric locations of said pixels, said locations being stored in X–Y designated locations; and second memory means (56) responsive to said data control and computation means (10, 16) for storing said display signals representative of generated data which is directed for appearance in said discrete area.

3. A system as set forth in claim 2 wherein said data control and computation means (10, 16) includes means for selectively varying the size of data entered in said discrete area.

4. A system as set forth in claim 3 wherein said data control and computation means (10, 16) includes means for adjusting the horizontal dimension of data included in said discrete area (22).

5. A system as set forth in claim 4 wherein said data control and computation means (10, 16) includes means for adjusting the vertical dimension of data entered in said discrete area.

6. A system as set forth in claim 5 wherein said data control and computation means (10, 16) includes means responsive to the contents of said first memory means (54) for measuring the horizontal (38) commencement and end (42) of a said portion [or] *of* said document.

7. A system as set forth in claim 6 wherein said data control and computation means includes means for sensing the number of character positions in a said portion of a said document, and data entry of a character in said discrete area (22) is horizontally sized is a function of measured size of said portion and number of said character positions.

8. A system as set forth in claim 7 wherein said data control and computation means includes means for measuring the height of characters in said portion of said document and includes means for adjusting the height of characters entered in said discrete area.

9. A system as set forth in claim 2 further comprising third memory means (58) for storing a dictionary of error substitution data, and said data control and computation means (10, 16) includes means for exchanging selected discrete area entered data for error substituted data wherein errors may be thus embedded in said discrete area.

10. A system as set forth in claim 9 further comprising fourth memory means (60) for storing data, and said data control and computation means (10, 16) includes means for storing in said fourth memory means discrete area entered data as modified by error substitution data.

11. A system as set forth in claim 10 further comprising:

fifth memory means (62) for storing data; and said display means (13) being responsive to the contents of said fourth memory means (60) and said data entry and command means (20, 21, 29) for displaying data in said discrete area (22) from said fourth memory means (60) and entering at least an indication of desired corrections in said fifth memory means.

12. A system as set forth in claim 11 wherein said desired corrections are entered in said fifth memory means (62).

13. A system as set forth in claim 12 wherein said data control and computation means includes means for comparing the contents of said fourth memory means (60) with said fifth memory means (62) whereby found and non-found embedded errors are registered.

14. A system as set forth in claim 13 further comprising sixth memory means (64) responsive to said data control and computation means (10, 16) and responsive to any difference between a correction entry which is not an embedded error from said fourth memory means (60) for storing corrections as a possible real error correction.

15. A system as set forth in claim 14 further comprising seventh memory means (66) and eighth memory means (68) for storing data and being responsive to said data entry and command means for storing at least the number of detected embedded errors in said seventh memory means (66) and for storing at least the number of undetected embedded errors in said eighth memory means (68).

16. A system as set forth in claim 15 wherein said data control and computation means (10, 16) includes means for estimating the number of undetected real errors.

17. A system as set forth in claim 16 wherein said data control and computation means (10, 16) includes means for dividing the number of unfound embedded errors by the total number of embedded errors and determining the quotient in percent (U) whereby the estimated number of real errors undetected is equal to *said* quotient (U) times the number of possible real errors found divided by the quantity, 100 minus said quotient (U).

18. A system as set forth in claim [11] *12* further comprising sixth memory means (72), and said data control and computation means is responsive to said second memory means (56), said fourth memory means (60), and said fifth memory means (62) for storing in said sixth memory means a revised text document with undetected embedded errors removed therefrom.

19. A system as set forth in claim 18 including seventh memory means (70) responsive to said data control and computation means for storing the estimated number of undetected real data entry errors.

20. A system as set forth in claim 2 wherein said discrete area is generally blank except for data created by said display signals.

21. A system as set forth in claim 2 wherein said discrete area is a window.

* * * * *